F. W. CARPENTER.
LUBRICATOR.

No. 172,702.  Patented Jan. 25, 1876.

WITNESSES
Henry N. Miller
A. L. Pierce

INVENTOR
Francis W. Carpenter
Alexander _____
Attorneys.

UNITED STATES PATENT OFFICE.

FRANCIS W. CARPENTER, OF HARRISON, NEW YORK.

IMPROVEMENT IN LUBRICATORS.

Specification forming part of Letters Patent No. 172,702, dated January 25, 1876; application filed January 20, 1876.

*To all whom it may concern:*

Be it known that I, FRANCIS W. CARPENTER, of Harrison, in the county of Westchester and in the State of New York, have invented certain new and useful Improvements in Lubricators; and do hereby declare that the following is a full, clear, and exact description thereof, reference being had to the accompanying drawings, and to the letters of reference marked thereon, making a part of this specification.

The nature of my invention consists in the construction and arrangement of a lubricator for wheels for vehicles, or other places where the same may be applied, as will be hereinafter more fully set forth.

In order to enable others skilled in the art to which my invention appertains to make and use the same, I will now proceed to describe its construction and operation, referring to the annexed drawing, in which—

Figure 1:
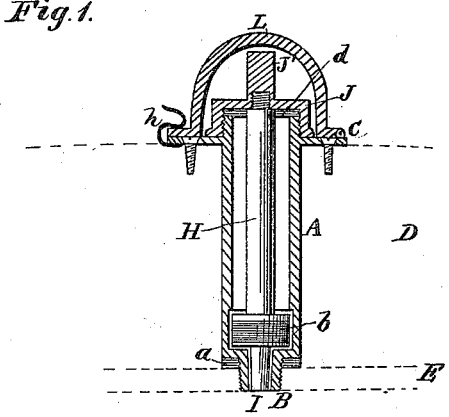
Figure 2:
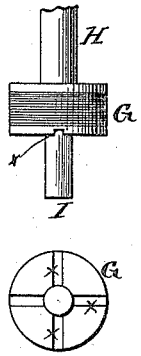

Figure 1 is a longitudinal section of my lubricating device. Fig. 2 shows the piston which forms part thereof.

A represents a tube of any suitable dimensions, provided at its inner end with a nipple, B, having exterior screw-threads. This tube is further, near its upper end, provided with a plate or flange, C, projecting all around the same. To insert this tube in the hub of a wheel a hole is bored through the hub D, and a smaller one through the box E, which latter hole has female screw-threads for the nipple B to screw into. The hole through the hub must, in many cases, be larger than the outside diameter of the tube, to allow the nipple to enter the hole in the box, and hence the tube will not be held rigidly in the hub, but be liable to come loose.

To obviate this and other difficulties I have provided the tube with the flange C above mentioned, so that when the tube is inserted, and the nipple screwed into the box, this flange will lie close to the outside of the hub, and is then fastened thereto by screws, nails, or other suitable means. By this means the tube A is held firmly in place, and cannot come loose; and at the same time it compresses a washer, a, placed around the nipple, between the box and lower end of the tube, so that there can be no leakage of oil in between the box and hub.

It will thus be seen that, even if the thread on the nipple should become worn, or otherwise injured, the flange C holds the tube firmly in its place, and also causes a firm and oil-tight joint at the inner end.

The lower end of the tube A is reamed out to form a chamber, b, a trifle larger than the bore of the tube, as shown in Fig. 1. G represents a piston, packed in any suitable manner to fit the interior of the tube A, and provided with a stem, H, extending upward through the tube, and a point, I, extending downward into the nipple B. On the upper end of the stem H is fastened a cap, J, to be screwed onto the upper end of the tube A.

After the tube A has been inserted and fastened in the hub, as above described, the tube is filled with oil, and by inserting the piston G in the tube and forcing it down the oil is forced down through the nipple B, in between the box and the axle. This operation may be repeated, if necessary, till a sufficient quantity of oil has been injected. The piston is then pressed down into the lower end of the tube, and oil poured on top of the same, after which the cap J is screwed down tight, a washer, d, being placed within the cap to form an oil-tight joint. When thus screwed down the piston G is within the enlarged chamber b at the lower end of the tube, and the point I passed through the nipple B. As the axle becomes hot the oil in the tube passes around the piston G, through grooves or channels x in the lower face thereof, and between the point and nipple to the axle. The point I prevents the nipple from becoming clogged with gum, &c.

The cap J on the upper end of the stem H is formed with a thumb-piece, J', for screwing and unscrewing the same.

To prevent this cap from coming loose, or injured by being knocked against anything, I provide a cover, L, of globe shape, hinged to the flange C at one side, and fastened at the opposite side by a suitable spring-catch, h. When this cover is closed it comes close down on the thumb-piece J', and, of course, prevents the same from turning.

This lubricator may be applied to other places or machinery as well as to wheels, wherever a lubricating device is needed.

Having thus fully described my invention, what I claim as new, and desire to secure by Letters Patent, is—

1. The piston G, with stem H, cap J, and point I, in combination with the tube A, having enlarged chamber $b$ at its lower end, substantially as and for the purposes herein set forth.

2. The hinged globe-shaped cover L, in combination with the tube A, flange C, and cap J, with thumb-piece J', substantially as and for the purposes herein set forth.

In testimony that I claim the foregoing I have hereunto set my hand this 20th day of January, 1876.

FRANCIS W. CARPENTER.

Witnesses:
J. M. MASON,
H. A. HALL.